(12) United States Patent
Nakagawa et al.

(10) Patent No.: US 11,252,294 B2
(45) Date of Patent: Feb. 15, 2022

(54) DOCUMENT CONVEYANCE APPARATUS

(71) Applicant: KYOCERA Document Solutions Inc., Osaka (JP)

(72) Inventors: Takafumi Nakagawa, Osaka (JP); Yoshiaki Tashiro, Osaka (JP); Kenichiro Kawasaki, Osaka (JP); Yoshitaka Tokoro, Osaka (JP); Hirofumi Hagihara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/027,971

(22) Filed: Sep. 22, 2020

(65) Prior Publication Data

US 2021/0099593 A1 Apr. 1, 2021

(30) Foreign Application Priority Data

Sep. 26, 2019 (JP) .............................. JP2019-175024
Sep. 26, 2019 (JP) .............................. JP2019-175025
(Continued)

(51) Int. Cl.
*H04N 1/00* (2006.01)
*B65H 5/36* (2006.01)
*B65H 5/06* (2006.01)

(52) U.S. Cl.
CPC ......... *H04N 1/00615* (2013.01); *B65H 5/062* (2013.01); *B65H 5/36* (2013.01); *H04N 1/00809* (2013.01); *B65H 2801/06* (2013.01)

(58) Field of Classification Search
CPC .......... B65H 2402/10; B65H 2402/441; B65H 2801/06; B65H 2801/39; B65H 29/60;
(Continued)

(56) References Cited

U.S. PATENT DOCUMENTS

| 10,009,493 B2* | 6/2018 | Kakuta | .............. H04N 1/00572 |
| 2011/0052289 A1* | 3/2011 | Ogasawara | .............. B65H 5/26 |
| | | | 399/367 |

(Continued)

FOREIGN PATENT DOCUMENTS

| JP | 2000-026003 A | 1/2000 |
| JP | 2018-198359 A | 12/2018 |

OTHER PUBLICATIONS

The extended European search report issued by the European Patent Office dated Feb. 26, 2021, which corresponds to European Application No. 20197091.0-1017 and is related to U.S. Appl. No. 17/027,971.

*Primary Examiner* — Negussie Worku
(74) *Attorney, Agent, or Firm* — Studebaker & Brackett PC

(57) ABSTRACT

A document conveyance apparatus includes a first conveyance path, a first image reading part, a second conveyance path, a third conveyance path and a branch guide. The first conveyance path extends linearly. The first image reading part reads an image on one face of the document conveyed along the first conveyance path. The second conveyance path branches from the first conveyance path at a branch point on a downstream side of the first reading part in a conveyance direction of the document and is formed to be curved. The third conveyance path branches from the first conveyance path at the branch point and extends linearly in a same extending direction as an extending direction of the first conveyance path. The branch guide is provided at the branch point and guides the document to the second conveyance path or to the third conveyance path.

17 Claims, 16 Drawing Sheets

(30) Foreign Application Priority Data

Sep. 26, 2019 (JP) .............................. JP2019-175026
Sep. 26, 2019 (JP) .............................. JP2019-175027

(58) Field of Classification Search
CPC . B65H 5/062; B65H 5/26; B65H 5/36; B65H 2220/01; B65H 2511/11; B65H 2515/112; B65H 2301/4212; B65H 2405/1111; B65H 2405/11151; B65H 2405/3311; B65H 2405/3321; B65H 2701/1914; B65H 29/58; B65H 31/02; B65H 31/20; B65H 31/22; B65H 31/24; H04N 1/00615; H04N 1/00809
USPC .................................................. 358/498, 497
See application file for complete search history.

(56) References Cited

U.S. PATENT DOCUMENTS

| | | | | |
|---|---|---|---|---|
| 2014/0320873 A1* | 10/2014 | Kato | .................. | H04N 1/00578 |
| | | | | 358/1.12 |
| 2016/0251183 A1* | 9/2016 | Hongo | .................... | B65H 7/14 |
| | | | | 271/258.01 |
| 2016/0297635 A1* | 10/2016 | Hongo | .................... | B65H 7/06 |
| 2017/0149988 A1* | 5/2017 | Kakuta | .............. | H04N 1/00612 |
| 2017/0170754 A1* | 6/2017 | Yamagishi | ............... | B65H 5/06 |
| 2017/0308021 A1* | 10/2017 | Kato | ...................... | B65H 85/00 |
| 2021/0101769 A1* | 4/2021 | Kawasaki | .............. | B65H 31/24 |
| 2021/0114834 A1* | 4/2021 | Tashiro | ................ | B65H 3/0684 |

\* cited by examiner

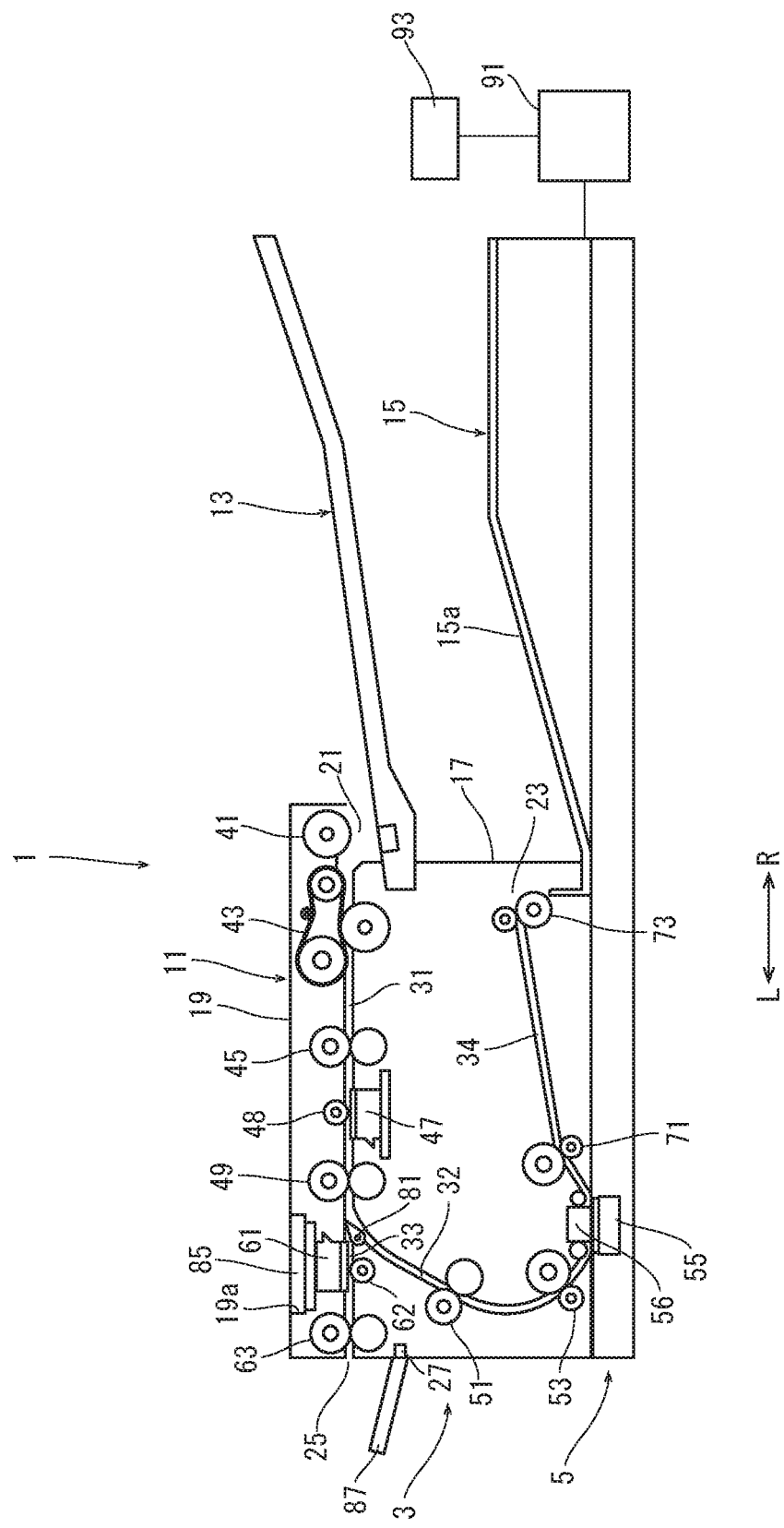

DOCUMENT CONVEYANCE APPARATUS

INCORPORATION BY REFERENCE

This application is based on and claims the benefit of priorities from Japanese Patent applications No. 2019-175024, No. 2019-175025, No. 2019-175026 and No. 2019-175027 filed on Sep. 26, 2019, which are incorporated by reference in its entirety.

TECHNICAL FIELD

The present disclosure relates to a document conveyance apparatus which reads an image of a document while conveying the document.

BACKGROUND

With a computerization of a document depending on a trend for paperless system in recent years, a quality and a function of a document reading device (DP) of a multifunctional peripheral (MFP) are being developed. In particular, it is required for the document reading device to cope with mediums having various weights and sizes. The document reading device is often configured to read an image of the document while conveying the document along a conveyance path curved in a U-shape. Then, a small size document such as a business card and an IC card, or a hard document having a large weight may not be conveyed along the curved conveyance path smoothly.

Then, an automatic document conveyance apparatus capable of reading an image of a medium having a business card size is sometimes configured to have a document escape part (an opening), formed on the upstream side of a conveyance path, through which a hard document having a predetermined width is passed.

However, in the above automatic document conveyance apparatus, because a conveyance path for the document is not linearly but inclined partially, it is difficult for a hard document having a large weight or a small size document to be conveyed. Furthermore, because the opening is set for a small size document, a size of the document to be read is limited.

SUMMARY OF THE INVENTION

In accordance with one aspect of the present disclosure, a document conveyance apparatus includes a first conveyance path, a first image reading part, a second conveyance path, a third conveyance path and a branch guide. The first conveyance path extends linearly, and along the first conveyance path, a document placed on a sheet feeding tray is conveyed. The first image reading part reads an image on one face of the document conveyed along the first conveyance path. The second conveyance path branches from the first conveyance path at a branch point on a downstream side of the first reading part in a conveyance direction of the document and is formed to be curved. The third conveyance path branches from the first conveyance path at the branch point and extends linearly in a same extending direction as an extending direction of the first conveyance path. The branch guide is provided at the branch point and guides the document to the second conveyance path or to the third conveyance path.

The above and other objects, features, and advantages of the present disclosure will become more apparent from the following description when taken in conjunction with the accompanying drawings in which a preferred embodiment of the present disclosure is shown by way of illustrative example.

BRIEF DESCRIPTION OF THE DRAWINGS

FIG. 8 is a sectional view schematically showing the document conveyance apparatus (at a conveyance of a normal document) according to the second embodiment of the present disclosure.

DETAILED DESCRIPTION

Hereinafter, with reference to the attached drawings, a document conveyance apparatus according to an embodiment of the present disclosure will be described.

Figure 1:
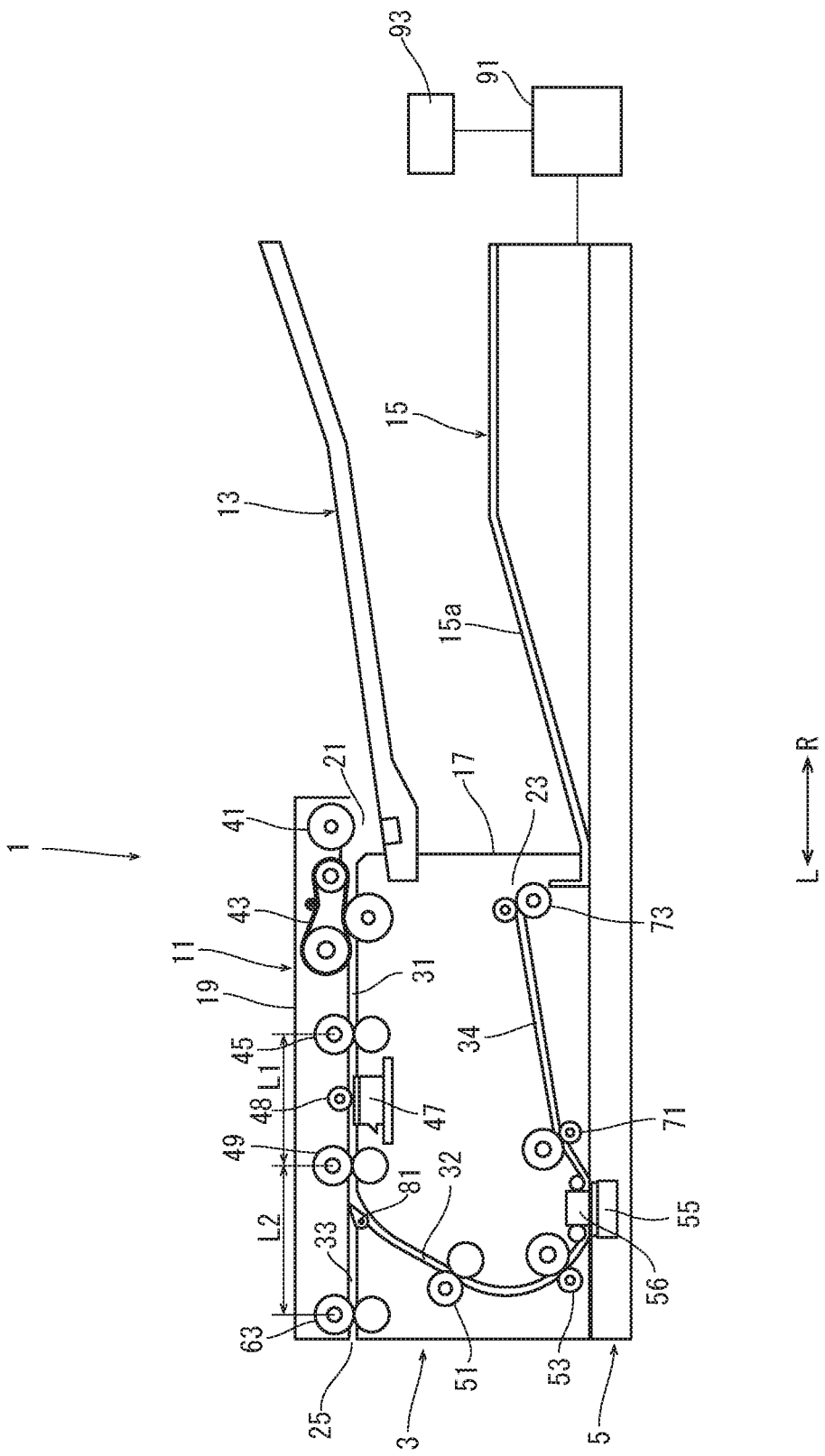
FIG. 1 is a sectional view schematically showing a document conveyance apparatus (at a conveyance of a normal document) according to a first embodiment of the present disclosure.
Figure 2:
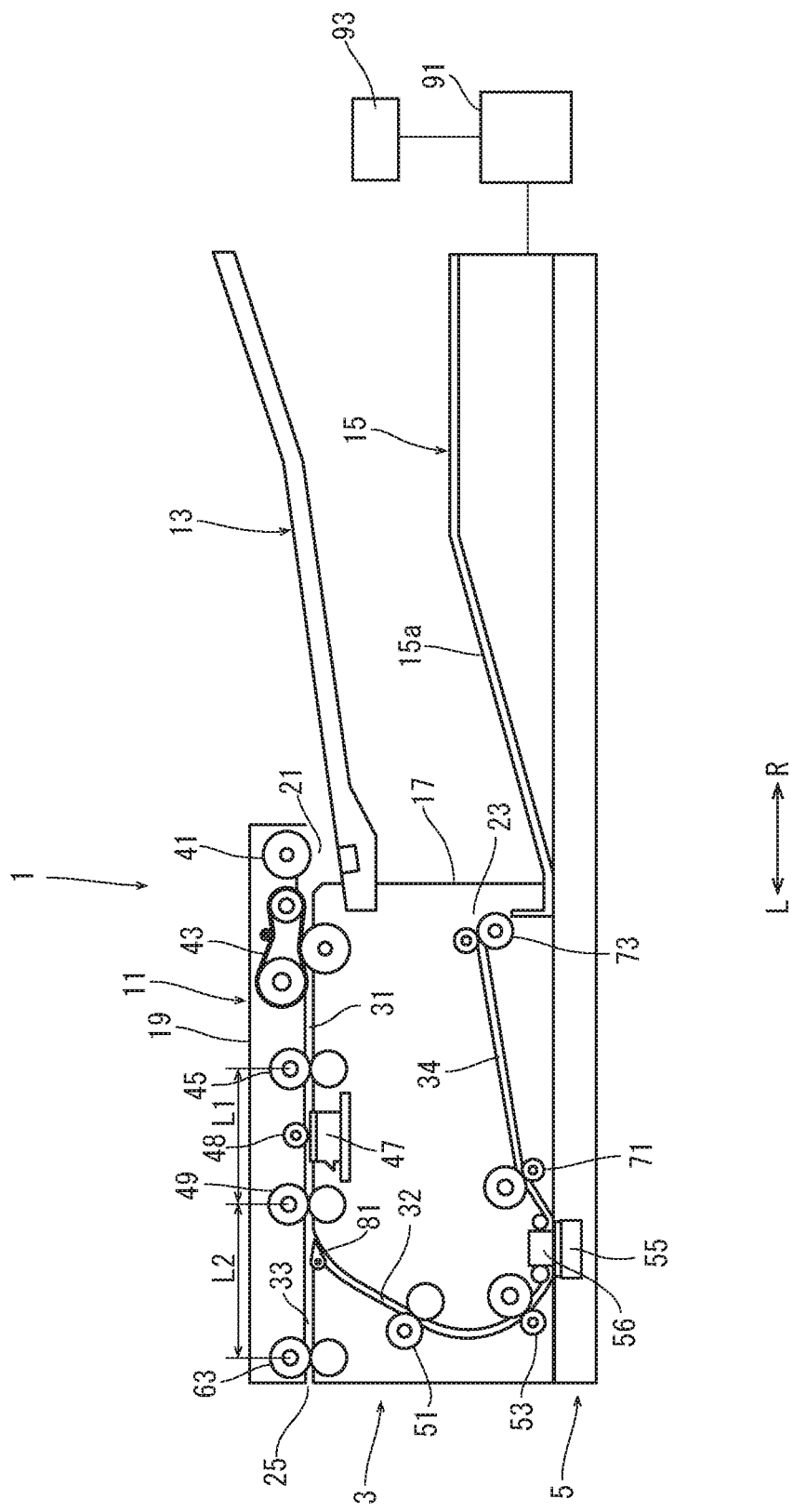
FIG. 2 is a sectional view schematically showing the document conveyance apparatus (at a conveyance of a special document) according to the first embodiment of the present disclosure.
Figure 3:
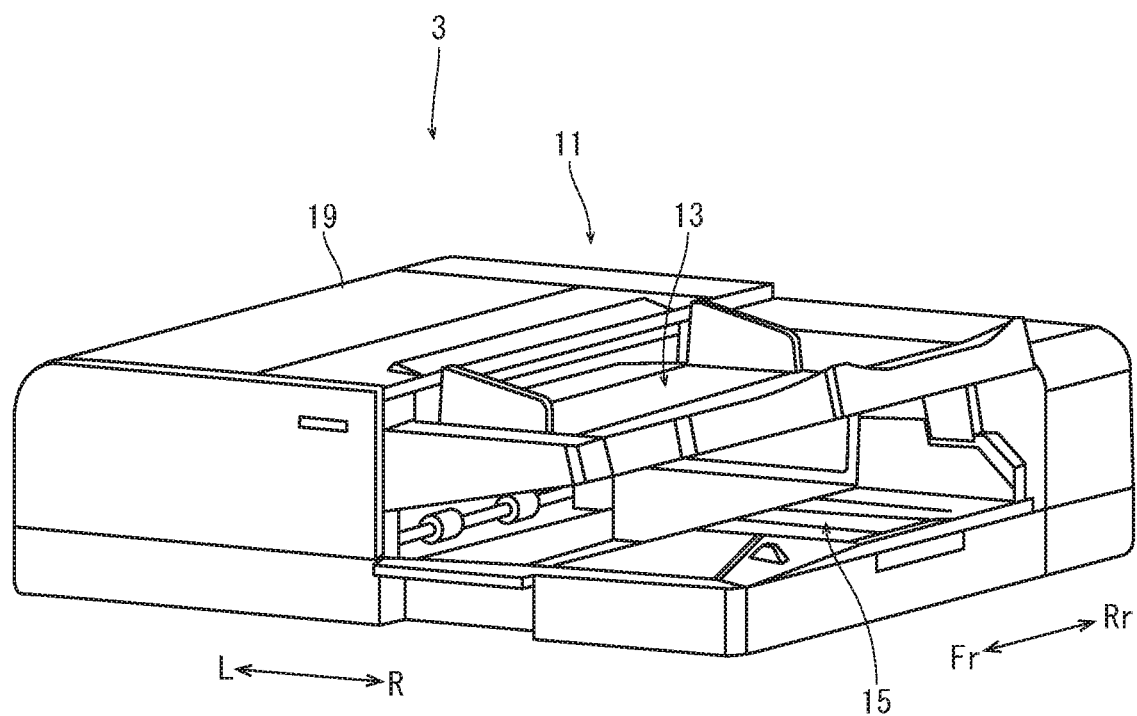
FIG. 3 is a perspective view showing a document conveyance device of the document conveyance apparatus according to the first embodiment of the present disclosure.

With reference to FIG. 1 to FIG. 3, the document conveyance apparatus 1 according to a first embodiment will be described. FIG. 1 and FIG. 2 are sectional views showing the document conveyance apparatus 1, and FIG. 3 is a perspective view showing a document conveyance device of the document conveyance apparatus 1. Fr, Rr, L and R marked in each figure show a front side, a rear side, a left side and a right side of the document conveyance apparatus 1, respectively.

The document conveyance apparatus 1 is placed on an upper face of an image forming apparatus (not shown), for example. The document conveyance apparatus 1 is configured to convey a document automatically and read images on both faces (the front face and the back face) of the document or an image on one face of the document. The image forming apparatus forms an image corresponding to the image read by the document conveyance apparatus 1 on both faces of a sheet or on one face of a sheet. Alternatively, the document conveyance apparatus 1 is electrically connected to an external computer, and used as a document reading device (a document input device, a scanner).

As shown in FIG. 1 and FIG. 2, the document conveyance apparatus 1 includes a document conveyance device 3 and an image reading device 5. The document conveyance device 3 is supported to the rear end portion of the image reading device 5 in a turnable manner. The detail description of the image reading device 5 is omitted.

The document conveyance device 3 includes a conveyance section 11 which reads an image of the document while conveying the document, a sheet feeding tray 13 on which the document of which the image is read is placed, and a discharge tray 15 on which the document is stacked after the image is read in the conveyance section 11.

The conveyance section 11 includes an inner guide part 17 and an outer cover 19, and is formed into an approximately parallelepiped shape forming an almost left half portion of the document conveyance device 3 as a whole (refer to FIG. 3 also). The outer cover 19 covers the upper face and the left side face of the inner guide part 17. The outer cover 19 is supported to the left lower corner of the inner guide part 17 in a turnable manner.

On the right side face of the conveyance section 11, a sheet feeding port 21 and a first discharge port 23 are formed. The sheet feeding port 21 is formed between the inner guide part 17 and the outer cover 19. The first discharge port 23 is formed on the right side face of the inner guide part 17 below the sheet feeding port 21. On the left side face of the conveyance section 11, that is, on the left side face of the outer cover 19, a second discharge port 25 is formed. The second discharge port 25 is disposed at almost the same height as the sheet feeding port 21.

In the conveyance section 11, a conveyance path for the document is formed. The conveyance path contains a first conveyance path 31, a second conveyance path 32, a third conveyance path 33 and a fourth conveyance path 34.

The first conveyance path 31 extends from the sheet feeding port 21 leftward linearly between the inner face of the outer cover 19 and the outer face (the upper face) of the inner guide part 17.

On the first conveyance path 31, a pickup roller 41, a separation roller unit 43, a first upstream side conveyance rollers pair 45, a first image reading unit 47 (a first image reading part), a correction roller 48 and a first downstream side conveyance rollers pair 49 are provided in order from an upstream side of a conveyance direction of the document. The separation roller unit 43 includes a supply belt wound around two pullies and a separation roller coming into contact with the supply belt. Each of the first upstream side conveyance rollers pair 45 and the first downstream side conveyance rollers pair 49 includes a drive roller and a driven roller driven by the drive roller to be rotated. The first image reading unit 47 is an image sensor which reads the image of the document. The correction roller 48 is a drive roller provided with a reflection plate for a shading compensation of the image sensor.

The pickup roller 41, the separation roller unit 43, the drive roller of the first upstream side conveyance rollers pair 45, the first image reading unit 47 and the drive roller of the first downstream side conveyance rollers pair 49 are supported on the outer face of the inner guide part 17. The driven roller of the first upstream side conveyance rollers pair 45, the correction roller 48 and the driven roller of the first downstream side conveyance rollers pair 49 are supported on the inner face of the outer cover 19.

A length L1 between the first upstream side conveyance rollers pair 45 and the first downstream side conveyance rollers pair 49 along the conveyance direction is shorter than a length of a minimum size document (for example, an IC card) capable of being conveyed by the document conveyance apparatus 1.

The second conveyance path 32 is branched from the downstream end of the first conveyance path 31, and extends so as to curve downward in an arc shape between the inner face of the outer cover 19 and the outer face (the left side face) of the inner guide part 17.

On the second conveyance path 32, a second upstream side conveyance rollers pair 51, a second downstream side conveyance rollers pair 53, a second image reading unit 55 (a second image reading part), a correction part 56 are provided in order from an upstream side in the conveyance direction. Each of the second upstream side conveyance rollers pair 51 and the second downstream side conveyance rollers pair 53 includes a drive roller and a driven roller driven by the drive roller to be rotated. The second image reading unit 55 is an image sensor which reads the image of the document. The correction part 56 is a reflection plate for a shading compensation of the image sensor.

The drive roller of the second upstream side conveyance rollers pair 51, the drive roller of the second downstream side conveyance rollers pair 53 and the correction part 56 are supported on the outer face of the inner guide part 17. The driven roller of the second upstream side conveyance rollers pair 51 and the driven roller of the second downstream side conveyance rollers pair 53 are supported on the inner face of the outer cover 19. The second image reading unit 55 is supported by the image reading device 5.

The third conveyance path 33 is branched from the downstream end of the first conveyance path 31, and extends leftward to the second discharge port 25 through the inner guide part 17. The third conveyance path 33 is formed into a linear path along the same left direction as the extending direction of the first conveyance path 31. That is, the first conveyance path 31 and the third conveyance path 33 form a linear conveyance path. Here, the linear shape contains a shape which does not make the conveyed document inverted and bent, and shows a shape capable of conveying a plastic card without resistance (without being curved and bent).

On the third conveyance path 33, a discharge rollers pair 63 is provided. The discharge rollers pair 63 includes a drive roller and a driven roller driven by the drive roller to be rotated. The driven roller of the discharge rollers pair 63 is supported on the upper face of the third conveyance path 33 and the drive roller of the discharge rollers pair 63 is supported on the lower face of the third conveyance path 33.

A length L2 between the first downstream side conveyance rollers pair 49 and the discharge rollers pair 63 along the conveyance direction is shorter than the length of a minimum size document (for example, an IC card) capable of being conveyed by the document conveyance apparatus 1.

The fourth conveyance path 34 is formed from the downstream end of the second conveyance path 32 to the first discharge port 23 along an oblique right upper direction through the inner guide part 17.

On the fourth conveyance path 34, a fourth conveyance rollers pair 71 and a discharge rollers pair 73 are provided in order from an upstream side in the conveyance direction. Each of the fourth conveyance rollers pair 71 and the discharge rollers pair 73 includes a drive roller and a driven roller driven by the drive roller to be rotated.

As described above, the outer cover 19 is supported to the left lower corner of the inner guide part 17 in a turnable manner, when the outer cover 19 is turned downward to cover the outer face (the upper face and the left side face) of the inner guide part 17, the first conveyance path 31 and the second conveyance path 32 are formed between the outer face of the inner guide part 17 and the inner face of the outer cover 19. On the other hand, when the outer cover 19 is turned upward to expose the outer face of the inner guide part 17, the first conveyance path 31 and the second conveyance path 32 are exposed for treatment of a sheet jamming.

In the inner guide part 17, at a branch point between the second conveyance path 32 and the third conveyance path 33, a branch guide 81 is provided. The branch guide 81 guides the document conveyed along the first conveyance path 31 to the second conveyance path 32 or the third conveyance path 33. The branch guide 81 includes a turnable guide plate and a solenoid which turns the guide plate.

The guide plate is a plate member longer in a width direction of the document and shorter in the conveyance direction. A tapered claw-shaped portion is formed in one end portion of the guide plate in the conveyance direction, and a turning shaft along the width direction is provided in the other end portion of the guide plate. The guide plate is disposed with the claw-shaped portion on an upstream side and the turning shaft on a downstream side in the conveyance direction, and turnable around the turning shaft upward and downward. The solenoid is disposed outside the document passing region in the width direction with a rod protruding upward. The tip end of the rod is coupled with the lower face of the guide plate. When the solenoid is not supplied with an electric power, the rod protrudes to turn the guide plate into an upward inclined posture and to guide the document from the first conveyance path 31 to the second conveyance path 32. When the solenoid is supplied with an electric power, the rod is retracted to turn the guide plate into almost a horizontal posture and to guide the document from the first conveyance path 31 to the third conveyance path 33. The solenoid is electrically connected to a controller 91. The solenoid is driven by the controller 91 to protrude or retract the rod.

The sheet feeding tray 13 is supported by the conveyance section 11 with a downstream inclined posture toward the sheet feeding port 21. The discharge tray 15 is formed integrally with the conveyance section 11 below the sheet feeding tray 13. The discharge tray 15 has a document stacking face 15a inclined upward to the right direction.

The document conveyance apparatus 1 is provided with an operation panel 93 as an operation part. The operation panel 93 includes a start button for starting the document conveyance operation and the image reading operation and a document selection button for selecting whether the document is a normal document (a plain paper or the others) or a special document (a small size document such as a business card and an IC card, or a document having a large weight). When the normal document is selected from the document selection button, the reading of the both faces of the document is possible, and when a special document is selected from the document selection button, the reading of one face (the back face) of the document is possible.

The operation panel 93 is electrically connected to the controller 91. When the start button is operated, the controller 91 starts the document conveyance operation and the image reading operation. When a special document is selected from the document selection button, the controller 91 supplies an electric power to the solenoid of the branch guide 81.

An example of the document conveyance operation and the image reading operation of the document conveyance apparatus 1 having the above configuration will be described. At the starting of the document conveyance operation and the image reading operation, a user operates the document selection button to select whether the document is a normal document or a special document. When the user selects a normal document, the solenoid of the branch guide 81 is not supplied with an electric power, and the guide plate of the branch guide 81 is kept in the upward inclined posture as shown in FIG. 1. Then, the branch guide 81 is set to guide the document from the first conveyance path 31 to the second conveyance path 32.

Next, the user places a document on the sheet feeding tray 13, and operates the start button of the operation panel 93 to start the document conveyance operation and the image reading operation. The document is fed from the sheet feeding tray 13 by the pickup roller 41, separated one by one by the separation roller unit 43 and then sent to the first conveyance path 31. When the document is conveyed by the first upstream side conveyance rollers pair 45 along the first conveyance path 31 and reaches the first image reading unit 47, an image on the back face of the document is read by the first image reading unit 47. Thereafter, the document is conveyed along the first conveyance path 31 by the first downstream side conveyance rollers pair 49, and then guided to the second conveyance path 32 by the branch guide 81.

When the document is conveyed along the second conveyance path 32 and reaches the second image reading unit 55, an image on the front face of the document is read by the second image reading unit 55. Then, the document is conveyed along the fourth conveyance path 34, and then discharged by the discharge rollers pair 73 through the first discharge port 23. The discharged document is stacked on the discharge tray 15.

On the other hand, when the user selects a special document, the controller 91 supplies an electric power to the solenoid of the branch guide 81 to turn the guide plate of the branch guide 81 to almost the horizontal posture as shown in FIG. 2. Then, the branch guide 81 is set to guide the document from the first conveyance path 31 to the third conveyance path 33.

The user places a document on the sheet feeding tray 13, and operates the start button of the operation panel 93 to start the document conveyance operation and the image reading operation. The document is fed from the sheet feeding tray 13 by the pickup roller 41, separated one by one by the separation roller unit 43 and then sent to the first conveyance path 31. When the document is conveyed by the first upstream side conveyance rollers pair 45 along the first conveyance path 31 and reaches the first image reading unit 47, an image on the back face of the document is read by the first image reading unit 47. Thereafter, the document is conveyed along the first conveyance path 31 by the first downstream side conveyance rollers pair 49, and then guided to the third conveyance path 33 by the branch guide 81. That is, the special document is conveyed linearly from the first conveyance path 31 to the third conveyance path 33.

The document is conveyed along the third conveyance path 33, and then discharged by the discharge rollers pair 63 through the second discharge port 25. Here, the outer cover 19 may be provided with a tray on which the document discharged through the second discharge port 25 is stacked. The tray may be foldable, or expandable and contractable, and may be stored in the outer cover 19 in a folded state or a contracted state.

As described above, according to the document conveyance apparatus 1 of the first embodiment, a special document such as a plastic hard document can be conveyed along the linear conveyance path formed by the first conveyance path 31 and the third conveyance path 33. Accordingly, it becomes possible to convey a special document smoothly without curving and bending the document and to read the image on one face (the back face) of the document.

Additionally, a length L1 between the first upstream side conveyance rollers pair 45 and the first downstream side conveyance rollers pair 49 and a length L2 between the first downstream side conveyance rollers pair 49 and the discharge rollers pair 63 are shorter than a length of a minimum size document, so that it becomes possible to give a conveyance force to a minimum size document and to convey a minimum size document stably. A length between the first downstream side conveyance rollers pair 49 and the second upstream side conveyance rollers pair 51 may be longer than a length of a minimum size document.

Additionally, the turning of the branch guide 81 is performed by selecting a normal document or a special document using the operation panel 93, so that a user's work in the document conveyance operation and the image reading operation can be decreased as much as possible.

Figure 4:
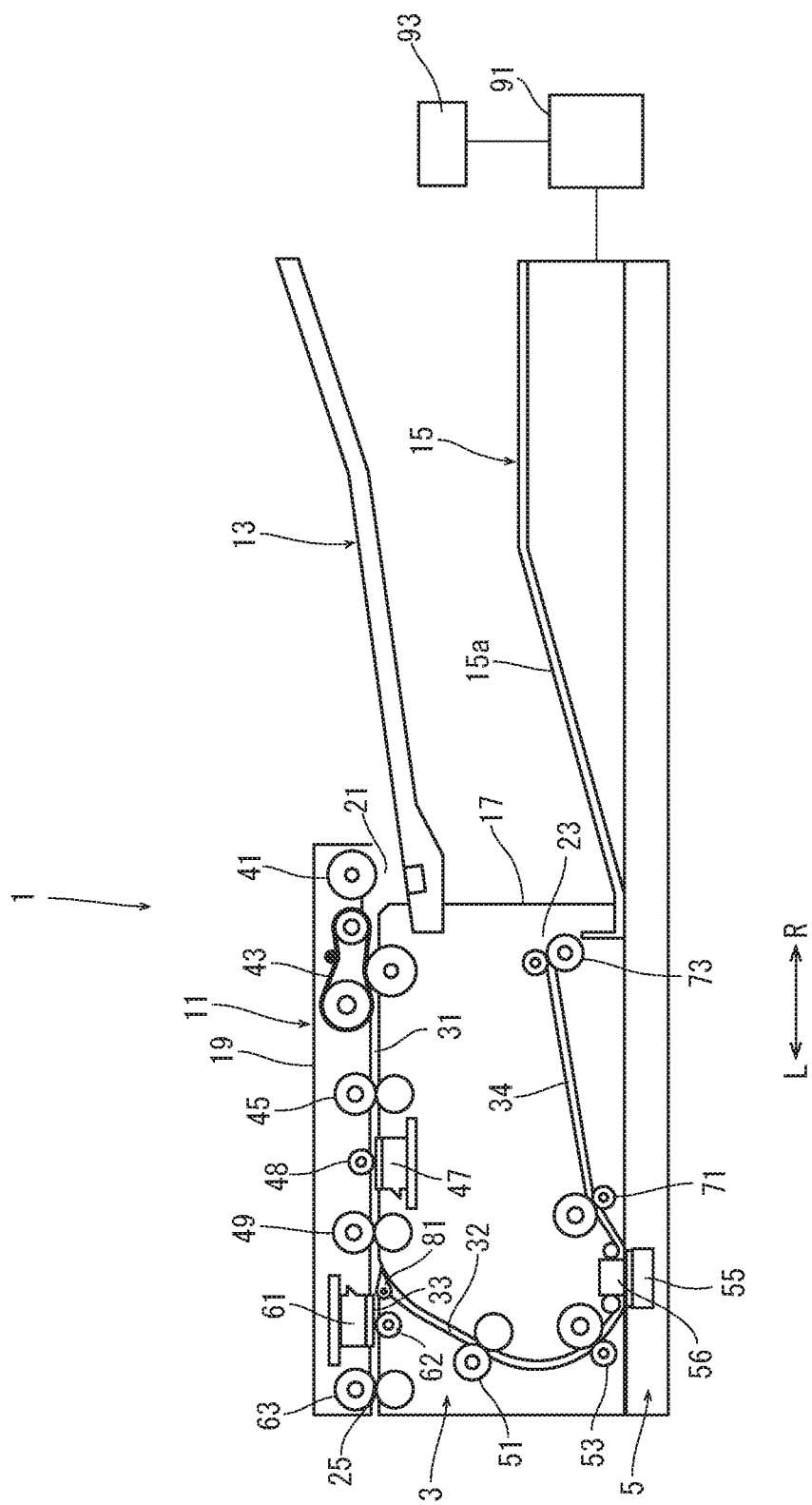
FIG. 4 is a sectional view schematically showing the document conveyance apparatus (at a conveyance of a special document) according to a modified example of the first embodiment of the present disclosure.

Next, with reference to FIG. 4, a modified example of the document conveyance apparatus 1 according to the first embodiment will be described. FIG. 4 is a sectional view showing the document conveyance apparatus 1.

In the modified example, on the third conveyance path 33, a third image reading unit 61 (a third image reading part) and a correction roller 62 are provided. The third image reading unit 61 and the correction roller 62 are disposed on an upstream side of the discharge rollers pair 63 of the third conveyance path 33, and supported by the inner guide part 17. The third image reading unit 61 is an image sensor which reads an image of a document. The correction roller 62 is a drive roller provided with a reflection plate for a shading compensation of the image sensor. The third image reading unit 61 is disposed on the upper face of the third conveyance path 33 and the correction roller 62 is disposed on the lower face of the third conveyance path 33.

An example of the document conveyance operation and the image reading operation of the document conveyance apparatus 1 having the above configuration will be described. When a normal document is selected from the operation panel 93, the same document conveyance operation and image reading operation as the first embodiment are performed.

When the user selects a special document, the controller 91 supplies an electric power to the solenoid of the branch guide 81 to turn the guide plate of the branch guide 81 to almost the horizontal posture as shown in FIG. 4. Then, the branch guide 81 is set to guide the document from the first conveyance path 31 to the third conveyance path 33. The user places a document on the sheet feeding tray 13 and operates the start button of the operation panel 93 to start the document conveyance operation and the image reading operation. The document is sent from the sheet feeding tray 13 by the pickup roller 41, separated one by one by the separation roller unit 43 and then fed to the first conveyance path 31. When the document is conveyed by the first upstream side conveyance rollers pair 45 and reaches the first image reading unit 47, an image on the back side of the document is read by the first image reading unit 47. Thereafter, the document is conveyed along the first conveyance path 31 by the first downstream side conveyance rollers pair 49 and guided to the third conveyance path 33 by the branch guide 81.

When the document is conveyed along the third conveyance path 33 and reaches the third image reading unit 61, an image on the front face of the document is read by the third image reading unit 61. The document is discharged by the discharge rollers pair 63 through the second discharge port 25.

According to the modified example described above, a special document such as a plastic hard document can be conveyed along the linear conveyance path formed by the first conveyance path 31 and the third conveyance path 33. Accordingly, it becomes possible to convey a special document smoothly without curving and bending the document and to read the images on both the faces of the document.

Next, with reference to FIG. 5 to FIG. 9, the document conveyance apparatus 1 according to a second embodiment will be described.

Figure 5:
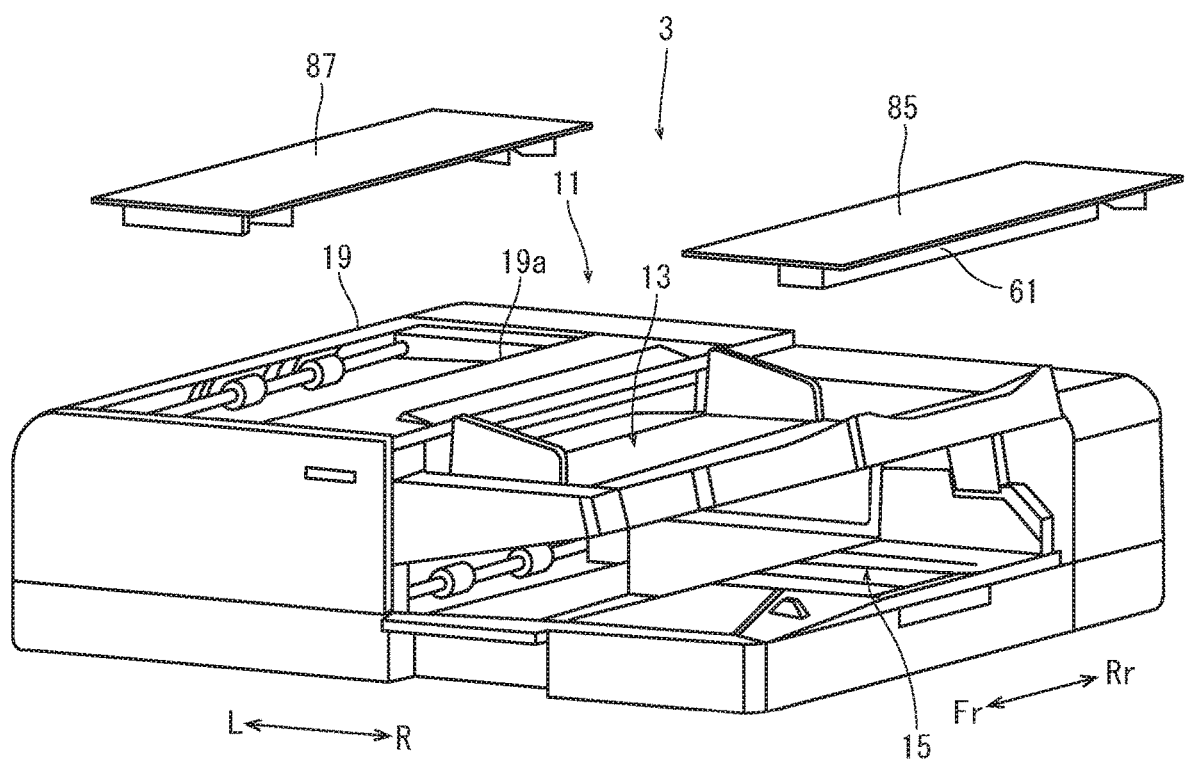
FIG. 5 is a perspective view showing a document conveyance device of a document conveyance apparatus according to a second embodiment of the present disclosure.
Figure 6:
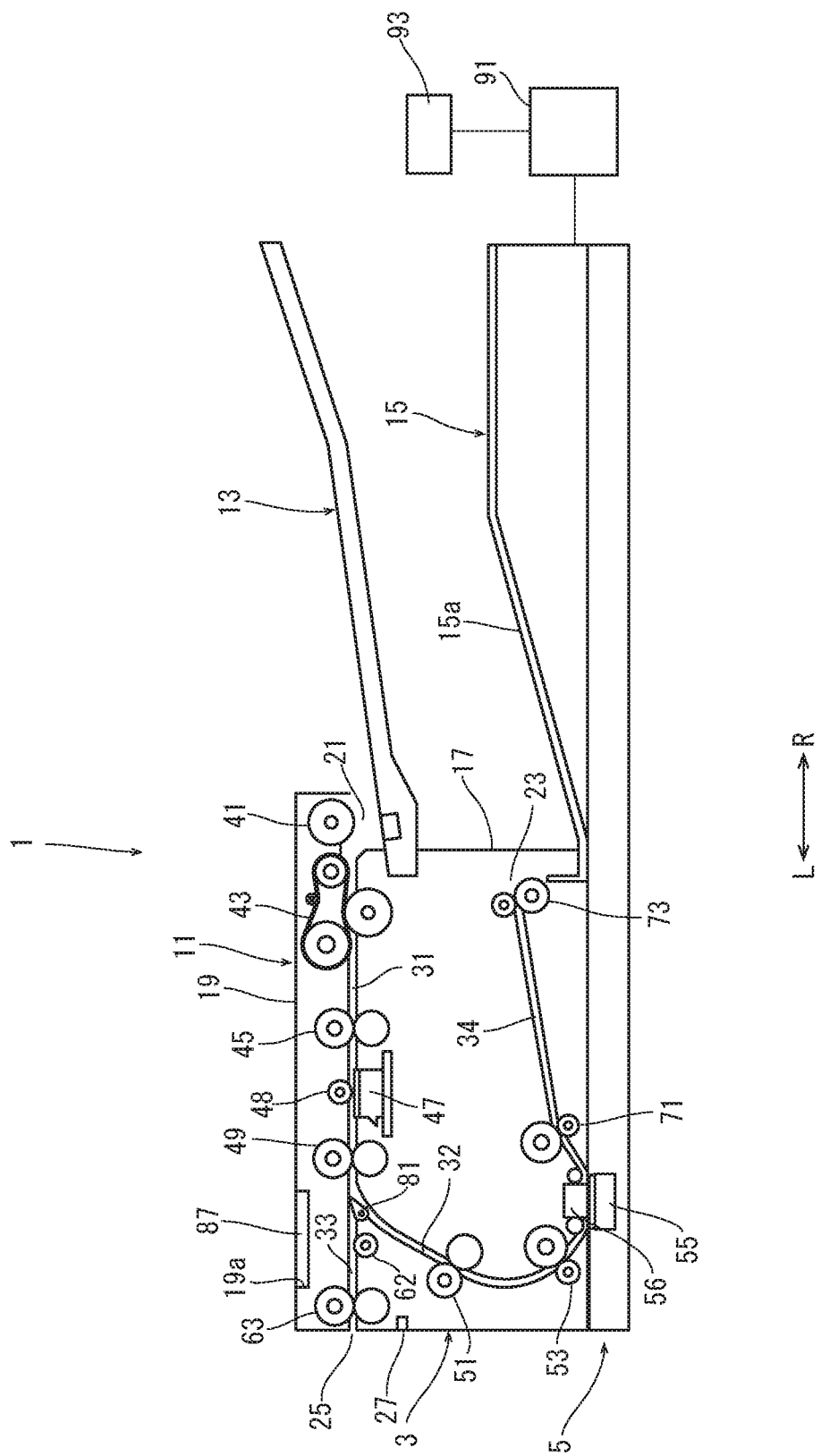
FIG. 6 is a sectional view schematically showing the document conveyance apparatus (at a conveyance of a normal document) according to the second embodiment of the present disclosure.
Figure 7:
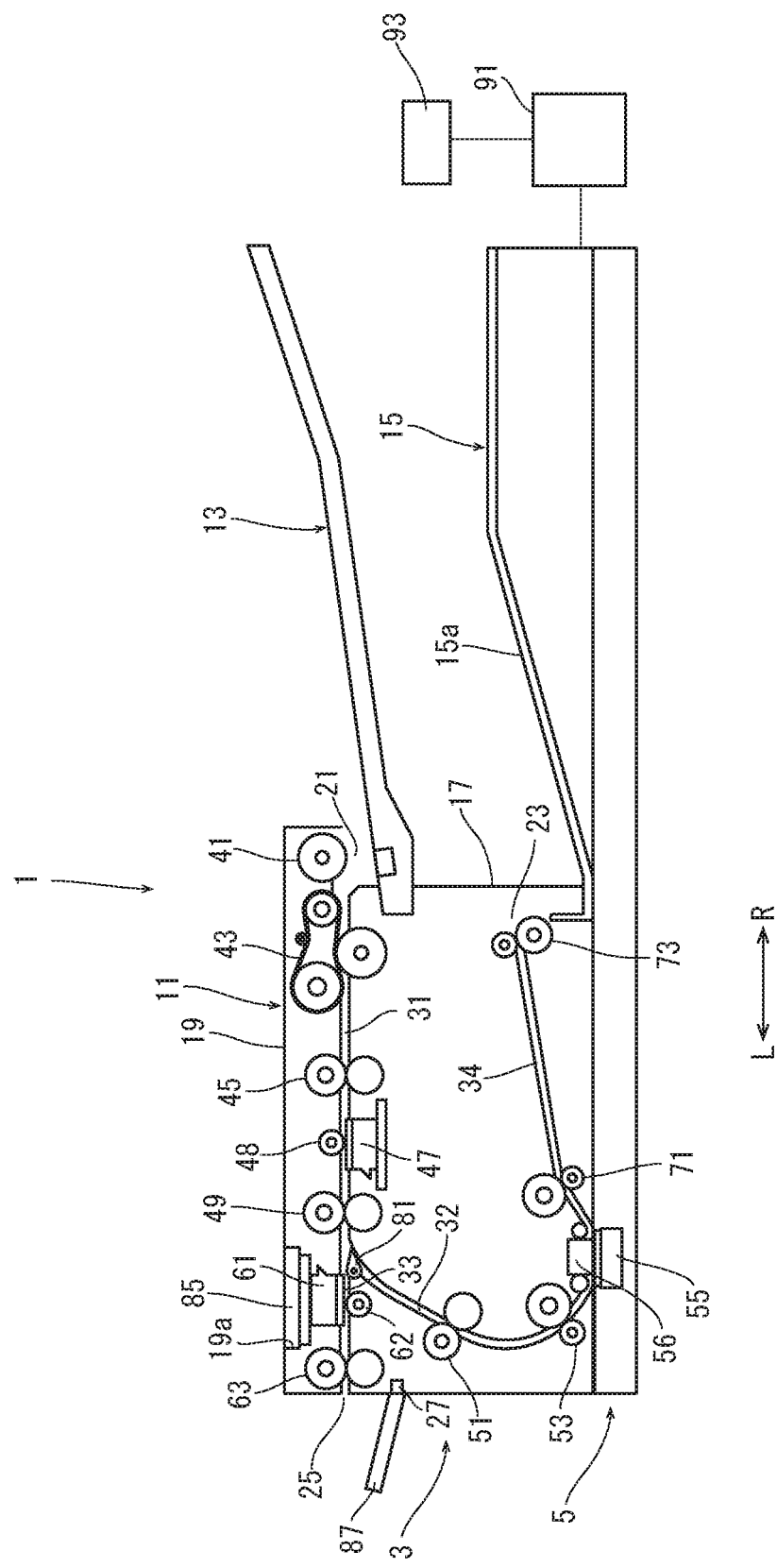
FIG. 7 is a sectional view schematically showing the document conveyance apparatus (at a conveyance of a special document) according to the second embodiment of the present disclosure.

In the second embodiment, as shown in FIG. 5, the outer cover 19 has an opening 19a. As shown in FIG. 6 to FIG. 8, the opening 19a is disposed between a portion on a downstream side of the branch point between the second conveyance path 32 and the third conveyance path 33 and a portion on an upstream side of the second discharge port 25.

Furthermore, on the left side face of the outer cover 19, a tray supporting portion 27 is formed below the second discharge port 25.

Furthermore, on the lower face of the third conveyance path 33, the correction roller 62 is disposed. The correction roller 62 is a drive roller provided with a reflection plate for a shading compensation of an image sensor, like the first embodiment.

As shown in FIG. 5, a reading cover 85 and a standard cover 87 is selectively attached to the opening 19a in a detachable manner. The reading cover 85 is provided with the third image reading unit 61. The third image reading unit 61 is an image sensor which read an image of a document. As shown in FIG. 7 and FIG. 8, when the reading cover 85 is attached to the opening 19*a*, the third image reading unit 61 faces the correction roller 62. On the other hand, the standard cover 87 is not provided with the third image reading unit 61.

An example of the document conveyance operation and the image reading operation of the document conveyance apparatus 1 having the above configuration will be described. When the document conveyance apparatus 1 is shipped, as shown in FIG. 6, the standard cover 87 is attached to the opening 19*a* of the outer cover 19. The reading cover 85 is provided together with the document conveyance apparatus 1 as an option, for example.

The document conveyance operation and the image reading operation of a normal document are performed in the same manner as the first embodiment. On the other hand, when a special document is selected, the user detaches the standard cover 87 from the opening 19*a* of the outer cover 19 and then the reading cover 85 is attached to the opening 19*a* as shown in FIG. 7. Then, the user sets the detached standard cover 87 to the tray supporting portion 27 of the outer cover 19.

After that, the user places a document on the sheet feeding tray 13 and operates the start button of the operation panel 93 to start the document conveyance operation and the image reading operation. The document is sent from the sheet feeding tray 13 by the pickup roller 41, separated one by one by the separation roller unit 43 and then fed to the first conveyance path 31. When the document is conveyed along the first conveyance path 31 by the first upstream side conveyance rollers pair 45 and reaches the first image reading unit 47, an image on the back side of the document is read by the first image reading unit 47. Thereafter, the document is conveyed along the first conveyance path 31 by the first downstream side conveyance rollers pair 49 and guided to the third conveyance path 33 by the branch guide 81.

Then, when the document is conveyed along the third conveyance path 33 and reaches the third image reading unit 61, an image on the front face of the document is read by the third image reading unit 61. Thereafter, the document is discharged through the second discharged port by the discharge rollers pair 63. The discharged document is stacked on the standard cover 87.

In a case where the reading of an image of a normal document is performed after the reading cover 85 is attached once, the user selects the normal document from the document selection button of the operation panel 93. Then, the controller 91 stops supplying an electric power to the solenoid of the branch guide 81, and then, as shown in FIG. 8, the branch guide 81 is tuned to the upward obliquely inclined posture. Thereby, the branch guide 81 is set to guide the document from the first conveyance path 31 to the second conveyance path 32. At this time, it is not necessary to detach the reading cover 85. That is, it becomes possible to maintain the reading cover 85 attached to the opening 19*a* always.

As described above, according to the document conveyance apparatus 1 of the second embodiment, it becomes possible to attach the reading cover 85 or the standard cover 87 to the opening 19*a* of the outer cover 19 selectively, so that when the standard cover 87 is attached to the opening 19*a* of the outer cover 19, the document conveyance apparatus 1 can be used commonly as a specification for reading a normal document only. That is, by replacing the reading cover 85 with the standard cover 87, a specification for reading both a normal document and a special document can be easily modified into a specification for reading a normal document only. The reading cover 85 may be prepared as an option together with the document conveyance apparatus 1 as described above, or may be purchased newly after the document reading device 1 is purchased.

Additionally, after the modification, the detached standard cover 87 is used as a discharge tray on which the document discharged from the third conveyance path 33 is stacked, so that it is not necessary to prepare a separate member as a discharge tray. However, a discharge tray used for the third conveyance path 33 only may be prepared.

In the present embodiment, the third image reading unit 61 is provided in the reading cover 85 while the third conveyance path 33, the correction roller 62, the discharge rollers pair 63 and the branch guide 81 are provided in the inner guide part 17, but they may be provided in the outer cover 19. Alternatively, the reading cover 85 may be provided with all of or some of the third conveyance path 33, the correction roller 62, the discharge rollers pair 63 and the branch guide 81, in addition to the third image reading unit 61. In the above manner, the third conveyance path 33, the discharge rollers pair 63 and the branch guide 81 may be provided in any of the reading cover 85, the outer cover 19 and the inner guide part 17.

As described above, by selectively attaching the elements (the third conveyance path 33, the third image reading unit 61, the correction roller 62 and the discharge rollers pair 63) necessary for conveying and reading a special document, a portion other than these elements can be used in common with a specification for reading a normal document only. Therefore, as the number of the elements provided in the reading cover 85 increases, unnecessary elements can be eliminated from the common specification portion in the specification for reading a normal document only, so that it becomes possible to make the common specification simple and to decrease the cost. That is, in addition to the third image reading unit 61, the third conveyance path 33, the correction roller 62 and the discharge rollers pair 63 may be provided in the reading cover 85. However, because the third image reading unit 61 (the image sensor) is relatively expensive, the cost can be decreased even if only the third image reading unit 61 is provided in the reading cover 85.

The outer cover 19 is not necessarily used for the treatment of the sheet jamming on the first conveyance path 31 and the second conveyance path 32, and may cover a part of the third conveyance path 33.

In a case where the reading cover 85 is provided with the correction roller 62, when the reading cover 85 is attached to the opening 19*a*, the correction roller 62 is coupled with a motor (not shown) provided in the inner guide part 17 via a coupling structure.

An example of the coupling structure 100 of the correction roller 62 with the motor will be described with reference to FIG. 9A to FIG. 9C.

To one end (the rear end) of the rotational shaft of the correction roller 62, a roller side coupling 101 is fixed. The roller side coupling 101 is a columnar member along the axial direction of the rotational shaft. On the tip end face of the roller side coupling 101, a groove 103 perpendicular to the axial direction is formed. A tip side outer circumferential face 105 of the roller side coupling 101 is formed to be tapered as a guide face.

The correction roller 62 is supported by the reading cover 85 with the groove 103 along the horizontal direction.

The motor is stored in the rear portion of the inner guide part 17. To the tip end of a driving shaft 111 of the motor, a motor side coupling 113 is supported. The motor side coupling 113 is an approximately cylindrical member along the axial direction of the driving shaft 111. The motor side coupling 113 has an outer cylindrical part 115 and a circular plate part 117 provided in the hollow space of the outer cylindrical part 115 at the approximately axial center in the axial direction thereof.

The inner diameter of the outer cylindrical part 115 is larger than the outer diameter of the roller side coupling 101. A tip side outer circumferential face 119 of the outer cylindrical part 115 is formed to be tapered as a guide face.

On one face (the face on the tip side) of the circular plate part 117, a projection 121 along a direction perpendicular to the axial direction is formed. On the other face (the face on the side of the driving shaft 111), a connection cylinder 123 into which the tip end portion of the driving shaft 111 is insertable is formed. In the tip end portion of the driving shaft 111 and the connection cylinder 123, a key and a key groove (both are not shown) are formed respectively. The connection cylinder 123, that is, the motor side coupling 113 is movable along the axial direction of the driving shaft 111 and not rotatable around the driving shaft 111. Around the connection cylinder 123, a coil spring 125 as a biasing member is externally fitted. The coil spring 125 biases the circular plate part 117, that is, the motor side coupling 113 forward (in a direction separate away from the motor).

The motor side coupling 113 is supported by the driving shaft 111 with the projection 121 along the horizontal direction.

Figure 9A:
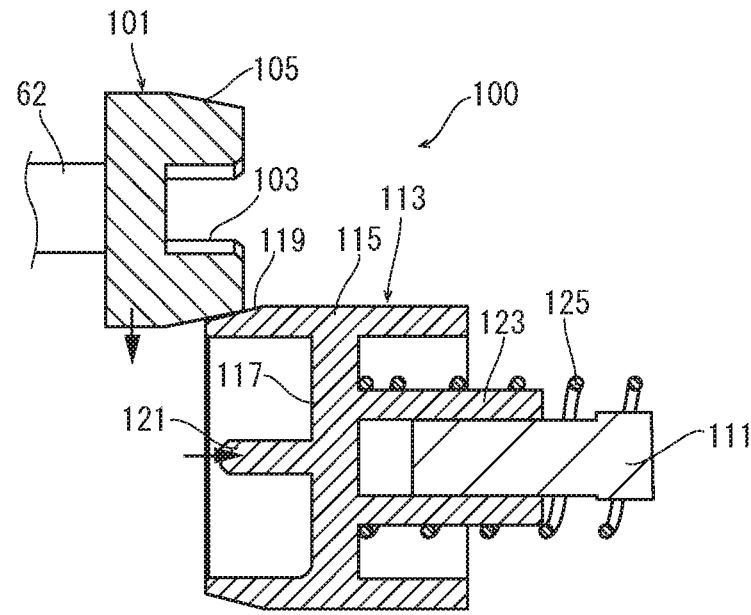
FIG. 9A is a sectional view showing a coupling structure of a correction roller and a motor (in a state where a roller side coupling comes into contact with a motor side coupling) in the document conveyance apparatus according to the second embodiment of the present disclosure.

When the reading cover 85 is attached to the opening 19*a* of the outer cover 19 from the upper side, as shown in FIG. 9A, the tapered outer circumferential face 105 of the roller side coupling 101 comes into contact with the tapered outer circumferential face 119 of the outer cylindrical part 115 of the motor side coupling 113. When the reading cover 85 is pushed in downward, the tapered outer circumferential face 119 of the outer cylindrical part 115 of the motor side coupling 113 is guided in the tapered direction of the tapered outer circumferential face 105 of the roller side coupling 101, and displaced to a side of the motor (rearward) along the driving shaft 111 against biasing force of the coil spring 125.

Then, when the tapered outer circumferential face 119 of the outer cylindrical part 115 of the motor side coupling 113 is separated away from the tapered outer circumferential face 105 of the roller side coupling 101, the motor side coupling 113 is biased by the coil spring 125, and displaced to a side separate away from the motor.

Figure 9B:
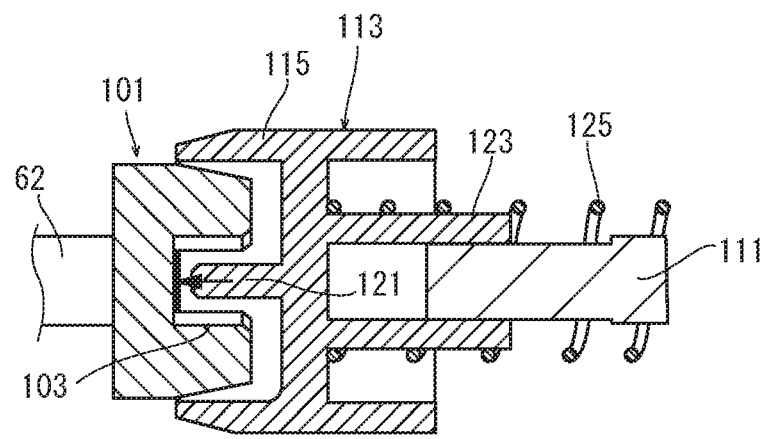
FIG. 9B is a sectional view showing the coupling structure of the correction roller and the motor (in a state where both the couplings are coupled with each other) in the document conveyance apparatus according to the second embodiment of the present disclosure.

Then, as shown in FIG. 9B, the roller side coupling 101 is fitted into the outer cylindrical part 115 of the motor side coupling 113, and the projection 121 is engaged with the groove 103. Thereby, both the couplings 101 and 113 are coupled with each other, so that it makes possible to transmit rotation of the motor to the correction roller 62 and to rotate the correction roller 62.

Figure 9C:
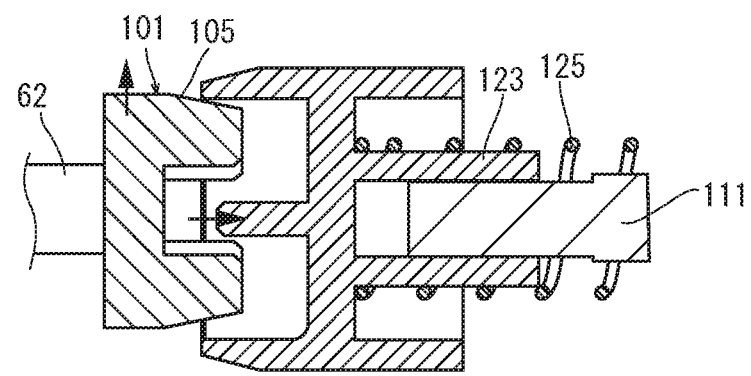
FIG. 9C is a sectional view showing the coupling structure of the correction roller and the motor (in a state where the roller side coupling is pulled upward with respect to the motor side coupling) in the document conveyance apparatus according to the second embodiment of the present disclosure.

When the reading cover 85 is pulled upward at the detachment of the reading cover 85, as shown in FIG. 9C, the tapered outer circumferential face 105 of the roller side coupling 101 comes into contact with the inner corner of the outer cylindrical part 115 of the motor side coupling 113. When the reading cover 85 is further pulled upward, the inner corner of the outer cylindrical part 115 of the motor side coupling 113 is guided in the tapered direction along the tapered outer circumferential face 105 of the roller side coupling 101, the motor side coupling 113 is displaced rearward against the biasing force of the coil spring 123, and then the projection 121 is separated away from the groove 103. When the reading cover 85 is further pulled upward, the motor side coupling 113 is separated away from the roller side coupling 101.

As described above, even if a case where an attachment direction of the reading cover 85 is crossed to a coupling direction of the correction roller 62 with the driving shaft 111, the coupling structure 100 makes it possible to couple the correction roller 62 with the driving shaft 111 surely.

Figure 10:
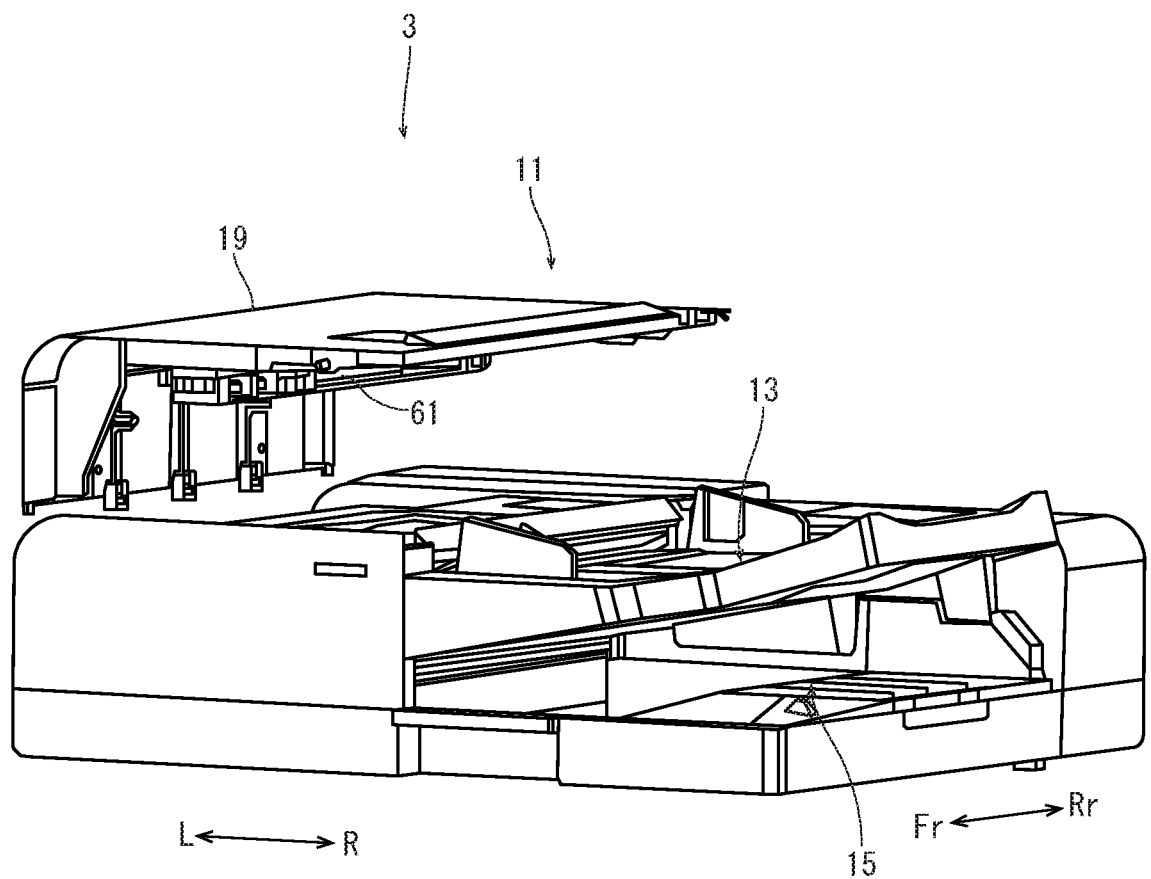
FIG. 10 is a perspective view showing a document conveyance device of a document conveyance apparatus according to a third embodiment of the present disclosure.

Next, with reference to FIG. 10 and FIG. 11, the document conveyance apparatus 1 according to a third embodiment will be described.

In the third embodiment, the outer cover 19 is supported to the left lower corner of the inner guide part 17 in a rotatable and detachable manner. As shown in FIG. 10, on the inner face of the outer cover 19, the third image reading unit 61 is supported.

Figure 11:
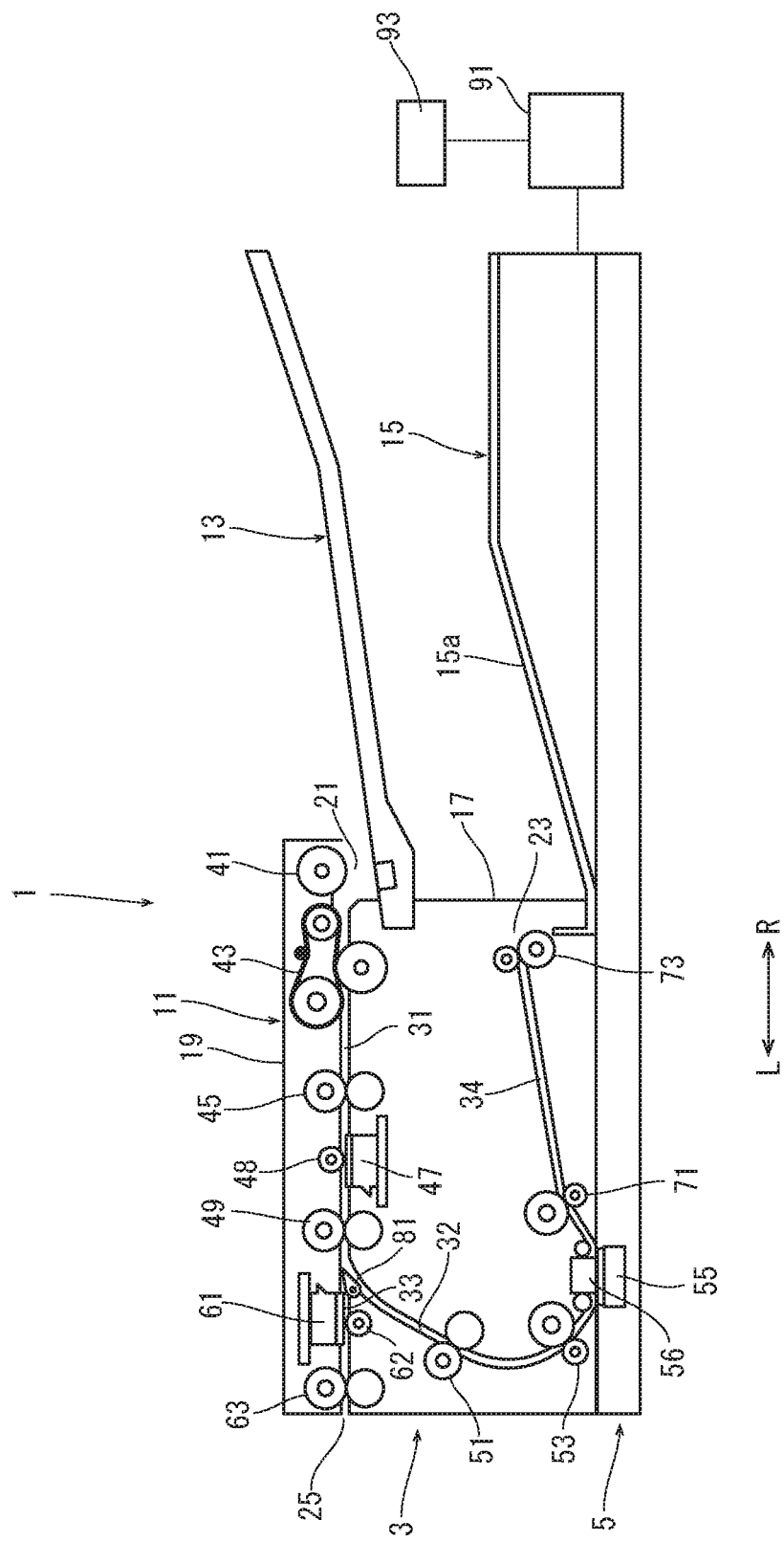
FIG. 11 is a sectional view schematically showing the document conveyance apparatus according to the third embodiment of the present disclosure.

As shown in FIG. 11, the third conveyance path 33, the correction roller 62 and the discharge rollers pair 63 are supported in the inner guide part 17. When the outer cover 19 is turned downward, the third image reding part 61 faces the correction roller 62.

The document conveyance apparatus 1 having the above configuration is provided as a specification for reading a special document, that is, a specification provided with the third conveyance path 33, the third image reading unit 61, the correction roller 62, the discharge rollers pair 63 and the branch guide 81 in advance. That is, the document conveyance apparatus 1 is selectively provided for a user who requires the reading of a special document. In the document conveyance apparatus 1, the document conveyance operation and the image reading operation of a normal document and a special document are performed in the same manner as in the first embodiment.

In the document conveyance apparatus 1 of the third embodiment, the parts other than the outer cover 19 have the same specification as the specification for reading a normal document. Furthermore, the outer cover 19 is detachable. Then, when a standard outer cover not provided with the third image reading unit 61 is prepared previously and then the outer cover 19 is replaced with the standard outer cover, the document conveyance apparatus of a specification for reading a normal document without requiring the reading a special document can be provided.

However, for a specification for reading a normal document only, although the third conveyance path 33, the correction roller 62, the discharge rollers pair 63 and the branch guide 81 are still provided, because the third image reading unit 61 (the image sensor) is relatively expensive, it becomes possible to differentiate prices of both the specifications based on the presence or absence of the third image reading unit 61.

Figure 12:
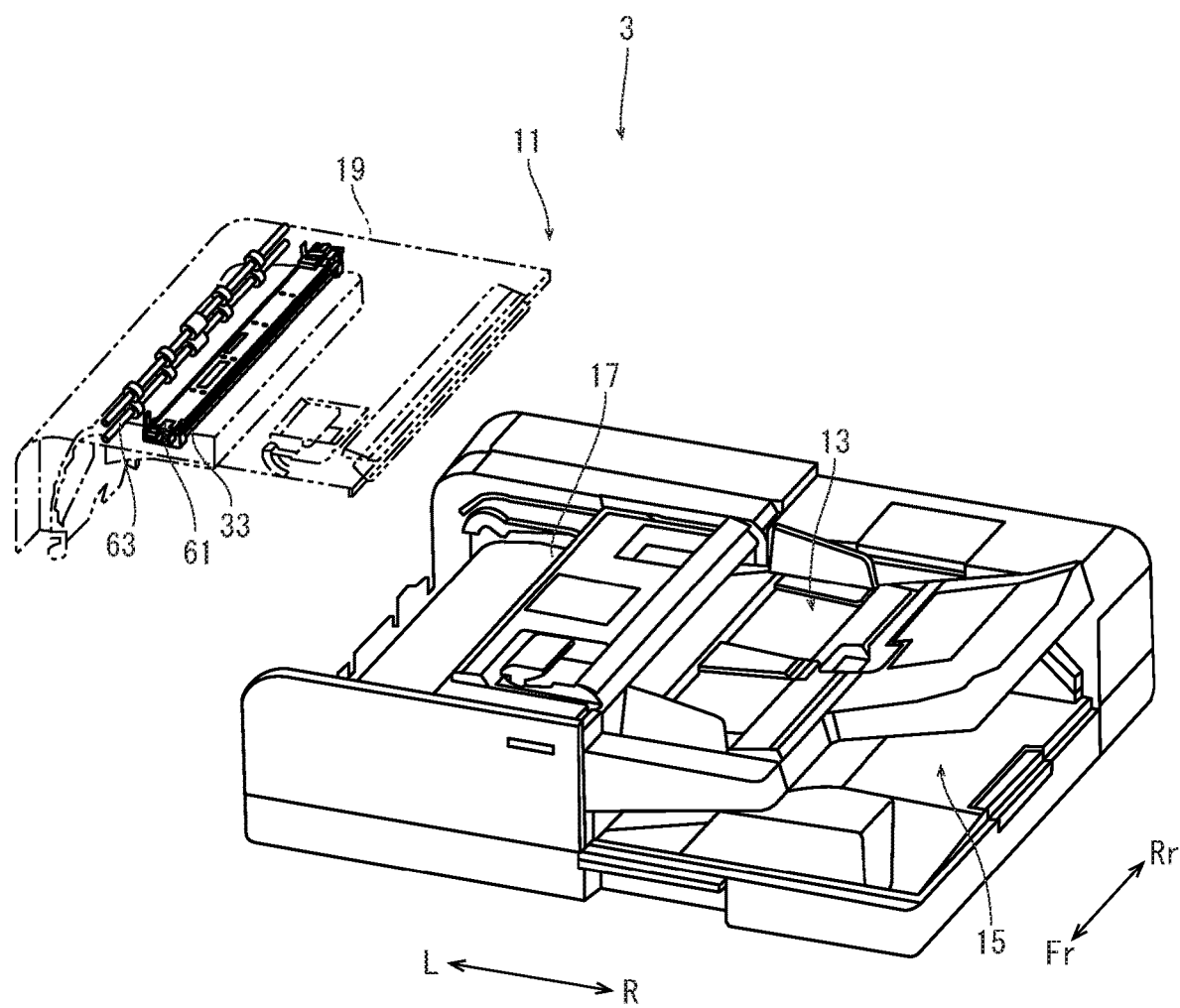
FIG. 12 is a perspective view showing the document conveyance device of the document conveyance apparatus according to a modified example of the third embodiment of the present disclosure.

Next, with reference to FIG. 12, a modified example of the document conveyance apparatus 1 of the third embodiment will be described.

In the modified example, the outer cover 19 is provided with the third conveyance path 33, the correction roller 62, the discharge rollers pair 63 and the branch guide 81, in addition to the third image reading unit 61 (the correction roller 62 and the branch guide 81 are not shown). That is, all of the elements required for reading a special document are provided in the outer cover 19.

In the modified example, a standard outer cover not provided with the elements required for reading a special document is prepared, when the outer cover 19 is replaced with the standard outer cover, it becomes possible to provide the document reading device of a specification for reading a normal document only. Furthermore, in the modified example, because the specification for reading a normal document does not contain the third conveyance path 33, the correction roller 62, the discharge rollers pair 63 and the branch guide 81, in addition to the third image reading unit 61, it becomes possible to more decrease the cost.

The outer cover 19 may be provided with any of the third conveyance path 33, the correction roller 62, the discharge rollers pair 63 and the branch guide 81, together with the third image reading unit 61.

Next, with reference to FIG. 13 to FIG. 16, the document conveyance apparatus 1 according to a fourth embodiment will be described.

Figure 13:
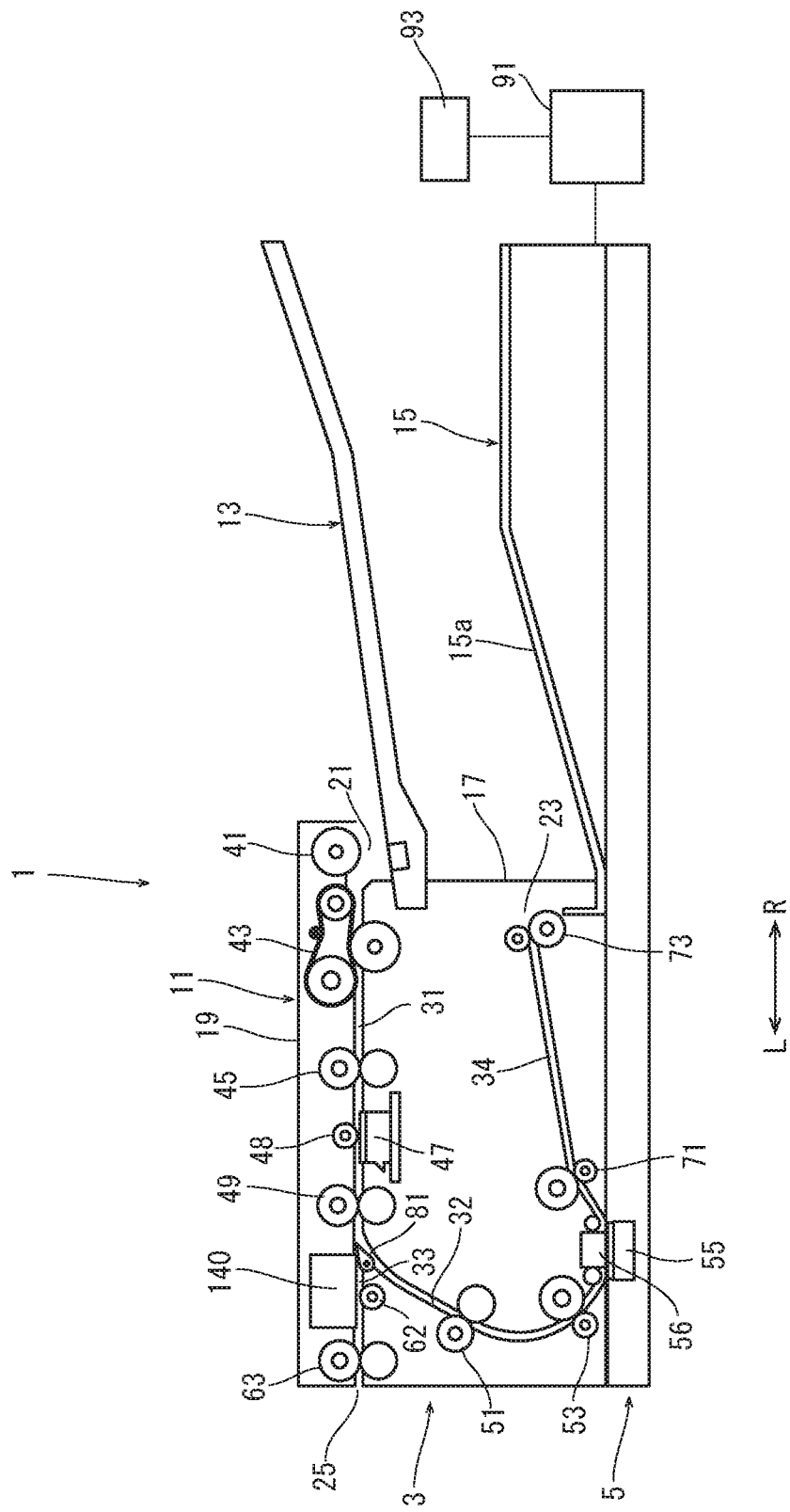
FIG. 13 is a sectional view schematically showing a document conveyance apparatus (at a conveyance of a normal document) according to a fourth embodiment of the present disclosure.
Figure 14:
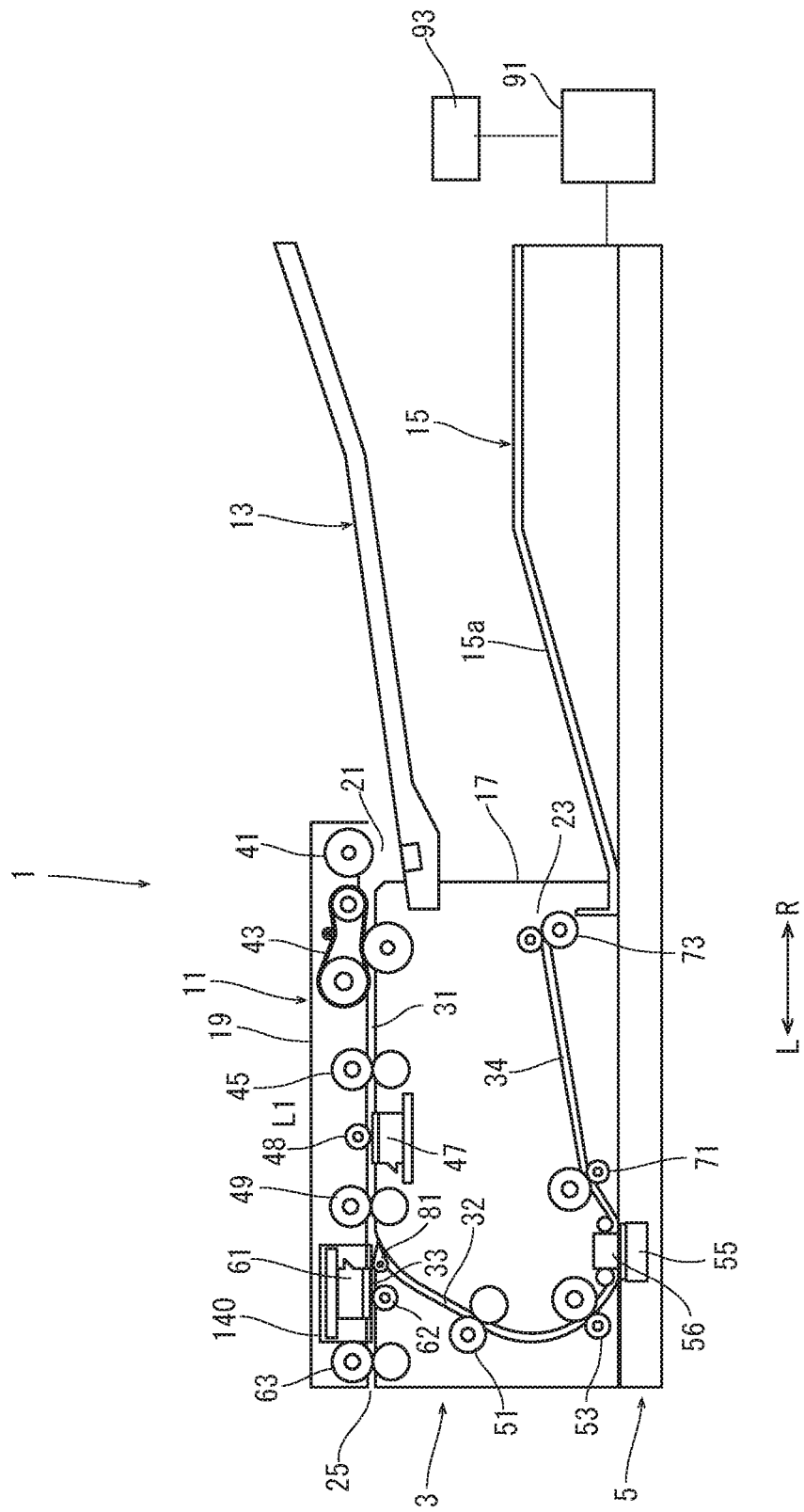
FIG. 14 is a sectional view schematically showing the document conveyance apparatus (at a conveyance of a special document) according to the fourth embodiment of the present disclosure.
Figure 15:
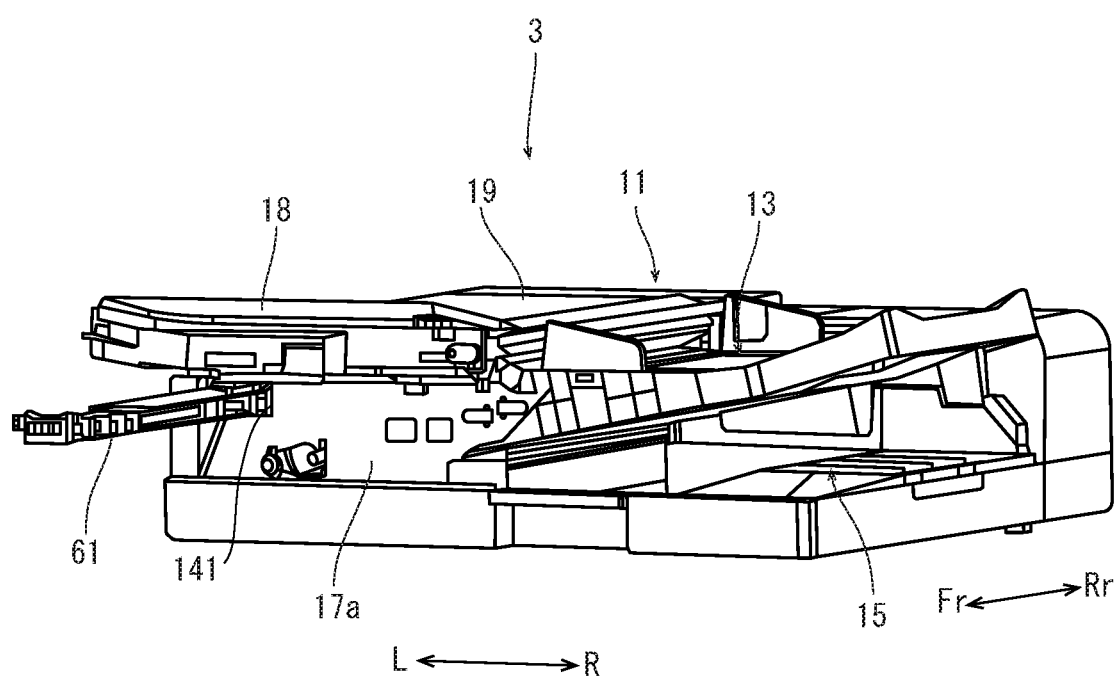
FIG. 15 is a perspective view showing the document conveyance device of the document conveyance apparatus according to the fourth embodiment of the present disclosure.

In the fourth embodiment, as shown in FIG. 13 to FIG. 15, a storage part 140, the correction roller 62 and the discharge rollers pair 63 are provided on the third conveyance path 33 in order from the upstream side in the conveyance direction.

Figure 16:
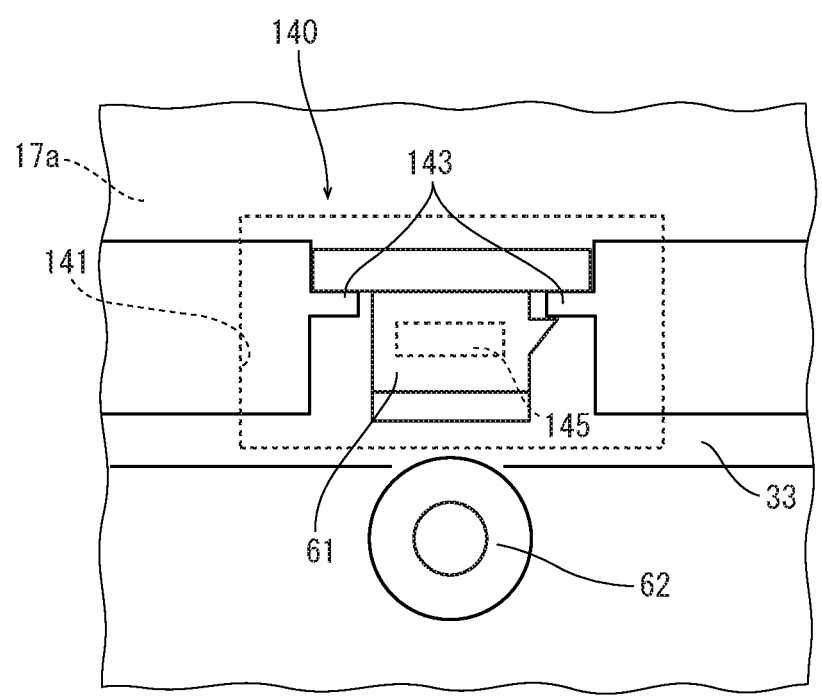
FIG. 16 is a front view schematically showing a storage part of the document conveyance apparatus according to the fourth embodiment of the present disclosure.

The storage part 140 will be described with reference to FIG. 15 and FIG. 16. The storage part 140 is formed in the inner guide part 17 above the third conveyance path 33. In the storage part 140, an opening 141 (refer to FIG. 15) formed in a front side plate 17a of the inner guide part 17, a pair of rails 143 and a main body side connector 145 are provided. The pair of rails 143 is communicated with the opening 141, and formed along the width direction (the front-and-rear direction) perpendicular to the conveyance direction of the document. The main body side connector 145 is provided in the inner guide part 17 on the back side (rear side) of the opening 141. The main body side connector 145 is connected to the controller 91 and a power source.

To the storage part 140, the third image reading unit 61 (the image sensor) is attached in a detachable manner. When the third image reading unit 61 is attached, as shown in FIG. 15, a front cover 18 is turned upward to expose the front side plate 17a of the inner guide part 17. Then, the third image reading unit 61 is inserted through the opening 141 into the storage part 140 and made to be slid rearward along the pair of rails 143. Then, a connector of the third image reading unit 61 is connected to the main body side connector 145 of the storage part 140, and then the third image reading unit 61 is electrically connected to the controller 91 and the power source.

The correction roller 62 is disposed on the lower face of the third conveyance path 33 below the storage part 140. The discharge rollers pair 63 is disposed on a downstream side of the storage part 140 and the correction roller 62.

An example of the document conveyance operation and the image reading operation of the document conveyance apparatus 1 having the above configuration will be described. At the shipping of the document conveyance apparatus 1, as shown in FUG. 13, the third image reading unit 61 is not attached to the storage part 140 of the third conveyance path 33. The third image reading unit 61 is prepared together with the document conveyance apparatus 1 as an option, for example. Alternatively, the third image reading unit 61 may be purchased newly after the document conveyance apparatus 1 is purchased.

The document conveyance operation and the image reading operation of a normal document are performed in the same manner as in the first embodiment. On the other hand, when it is needed to read a special document, the user attaches the third image reading unit 61 to the storage part 140. Thereafter, the document conveyance operation and the image reading operation of a special document are performed in the same manner as in the first embodiment.

As described above, according to the document conveyance apparatus 1 of the fourth embodiment, because the third image reading unit 61 is attached to the storage part 140 in a detachable manner, if the third image reading unit 61 is not attached to the storage part 140, the document conveyance apparatus 1 is provided as a specification for reading a normal document only. That is, by attaching the third image reading unit 61 to the storage part 140, it becomes possible to modify a specification for reading a normal document only into a specification for reading both a normal document and a special document easily.

Furthermore, the third image reading unit 61 can be attached and detached to and from the storage part 140 in an easy manner such that the front cover 18 is turned and then the third image reading unit 61 is slid in one direction. The third image reading unit 61 may be attached and detached from the rear side of the conveyance section 11.

In the fourth embodiment, the storage part 140 is provided in the inner guide part 17, but may be provided in the outer cover 19. The third conveyance path 33, the correction roller 62, the discharge rollers pair 63 and the branch guide 81 are provided in the inner guide part 17, but all of or any of them may be provided in the outer cover 19.

In the above embodiments, the second conveyance path 32 is formed so as to be curved downward from the branch point, but may be formed so as to be curved upward from the branch point.

The present disclosure has been described with respect to specific embodiments, the present disclosure is not limited to the above embodiments. The above embodiment can be modified by those skilled in the art without departing from the scope and sprit of the present disclosure.

The invention claimed is:

1. A document conveyance apparatus comprising:
   a first conveyance path extending linearly and along which a document placed on a sheet feeding tray is conveyed;
   a first image reading part which reads an image on one face of the document conveyed along the first conveyance path;
   a second conveyance path branched from the first conveyance path at a branch point on a downstream side of the first reading part in a conveyance direction of the document and formed to be curved;
   a third conveyance path branched from the first conveyance path at the branch point and extending linearly in a same extending direction as an extending direction of the first conveyance path;
   a third image reading part which reads an image on the other face of the document conveyed along the third conveyance path; and
   a branch guide provided at the branch point and guiding the document to the second conveyance path or to the third conveyance path.

2. The document conveyance apparatus according to claim 1, further comprising a second image reading part which reads an image on the other face of the document conveyed along the second conveyance path.

3. The document conveyance apparatus according to claim 1, further comprising a cover for the third conveyance path, wherein
   the third image reading part is attachable to the cover.

4. The document conveyance apparatus according to claim 3, wherein
   the cover has an opening exposing a part of the third conveyance path, and a reading cover provided with the third image reading part or a standard cover not provided with the third image reading part is selectively attached to the opening.

5. The document conveyance apparatus according to claim 4, wherein
the cover has a discharge port through which the document is discharged from the third conveyance path, and
the standard cover is used as a discharge tray on which the document discharged through the discharge port is stacked, when it is not attached to the opening.

6. The document conveyance apparatus according to claim 4, wherein
the third image reading part is an image sensor,
a correction roller facing the third image reading part is provided, the correction roller and the third image reading part being disposed on both sides of the third conveyance path, and
the correction roller is provided in the reading cover.

7. The document conveyance apparatus according to claim 4, wherein
the branch guide is provided in the reading cover.

8. The document conveyance apparatus according to claim 4, further comprising a discharge rollers pair provided on a downstream side of the third image reading part in the conveyance direction of the document, wherein
the discharge rollers pair is provided in the reading cover.

9. The document conveyance apparatus according to claim 1, further comprising a cover for the first to third conveyance paths, wherein
the third image reading part is provided in the cover.

10. The document conveyance apparatus according to claim 9, wherein
the cover is attachable and detachable.

11. The document conveyance apparatus according to claim 9, wherein
the third conveyance path is provided in the cover.

12. The document conveyance apparatus according to claim 9, wherein
the third image reading part is an image sensor,
a correction roller facing the third image reading part is provided, the correction roller and the third image reading part being disposed on both sides of the third conveyance path, and
the correction roller is provided in the cover.

13. The document conveyance apparatus according to claim 9, wherein
the branch guide is provided in the cover.

14. The document conveyance apparatus according to claim 9, further comprising a discharge rollers pair provided on a downstream side of the third image reading part in the conveyance direction of the document, wherein
the discharge rollers pair is provided in the cover.

15. The document conveyance apparatus according to claim 1, further comprising a storage part to and from which the third image reading part is attachable and detachable along a width direction of the document perpendicular to the conveyance direction of the document.

16. The document conveyance apparatus according to claim 15, wherein
the third image reading part is an image sensor,
the storage part has:
an opening formed in a side plate of an inner guide part in which the third conveyance path is formed;
a rail formed from the opening along the width direction of the document; and
a connector provided on a downstream end side in an attachment direction of the third image reading part and electrically connectable to the third image reading part.

17. The document conveyance apparatus according to claim 1, further comprising an operation part which operates the branch guide and allows a user to select either the second conveyance path or the third conveyance path.

* * * * *